United States Patent

Southard

[15] 3,664,464
[45] May 23, 1972

[54] ANTISKID DEVICE

[72] Inventor: Charles V. Southard, Marietta, Ga.

[73] Assignee: Lockheed Aircraft Corporation, Burbank, Calif.

[22] Filed: June 24, 1970

[21] Appl. No.: 49,338

[52] U.S. Cl. ............................ 188/5, 188/168, 280/47.34
[51] Int. Cl. ............................................................ B60t 1/14
[58] Field of Search ..................... 188/4 R, 5, 119, 168, 169; 280/32.6, 47.34

[56] References Cited

UNITED STATES PATENTS

| | | | |
|---|---|---|---|
| 1,212,781 | 1/1917 | Luce | 188/5 |
| 2,297,589 | 9/1942 | Tackett | 188/168 |
| 2,957,549 | 10/1960 | Nesselberger | 188/4 R |
| 3,194,346 | 7/1965 | Stentz | 188/5 |

*Primary Examiner*—Duane A. Reger
*Attorney*—John J. Sullivan and George C. Sullivan

[57] ABSTRACT

This device attaches to the undersurface of a cargo pallet at the "uphill" side thereof and serves to restrain the palletized load if released as by accident during on and off loading operations of a vehicle. The device consists of a spring-loaded wedge held in a bracket in the retracted position off the adjacent surface during loading by tying a lanyard from the wedge to the tow cable. If the tow cable should fail, tension on the lanyard is automatically released and the spring-loaded wedge moves to the lower position to apply friction against the surface, when the palletized load begins moving by gravity down the incline. The foot of the wedge and the upper portion of the bracket which mates with the undersurface of the pallet are both covered with rubber or the like which serves to increase the frictional coefficient between the wedge and surface to prevent damage to the pallet.

6 Claims, 4 Drawing Figures

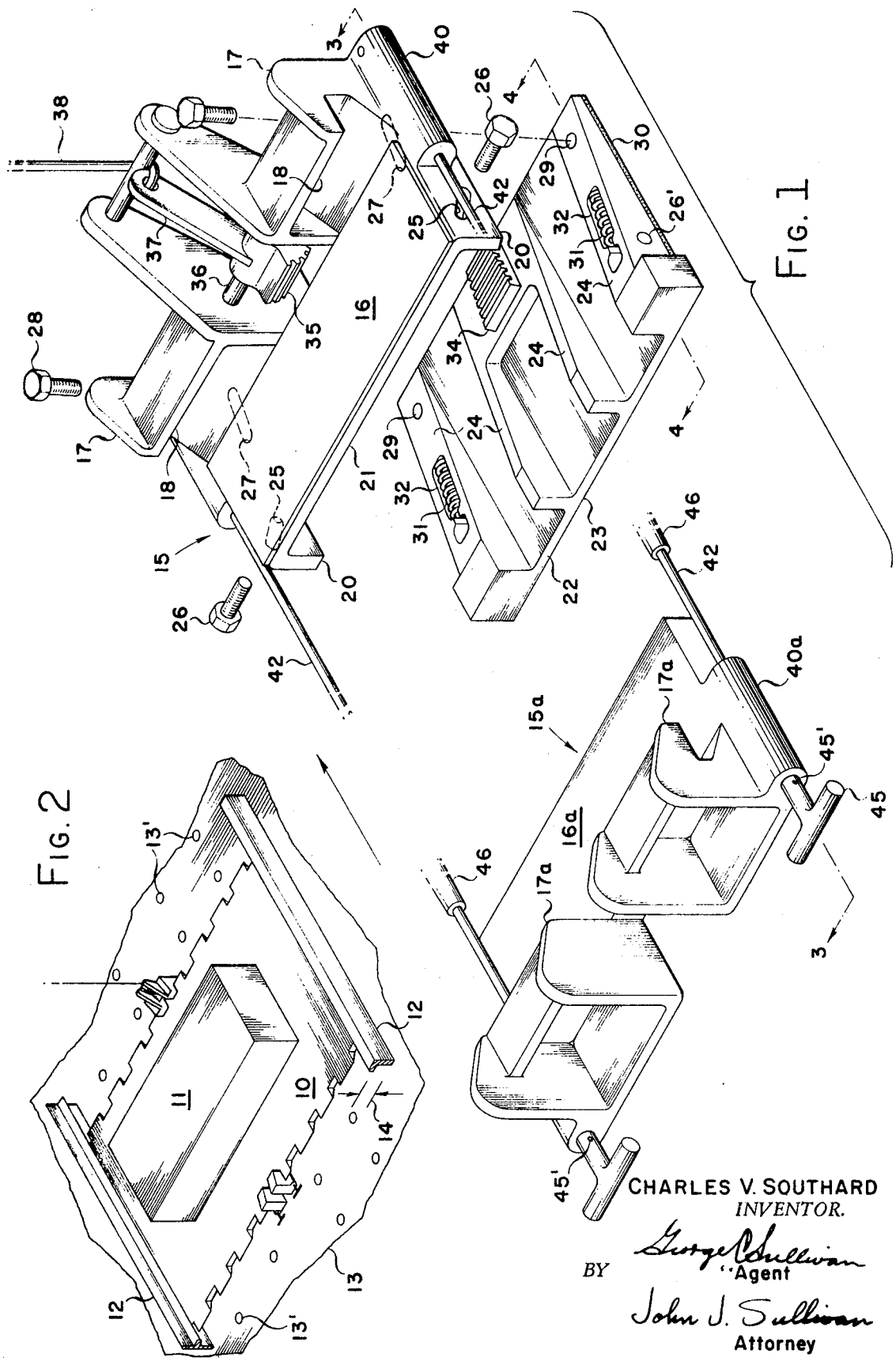

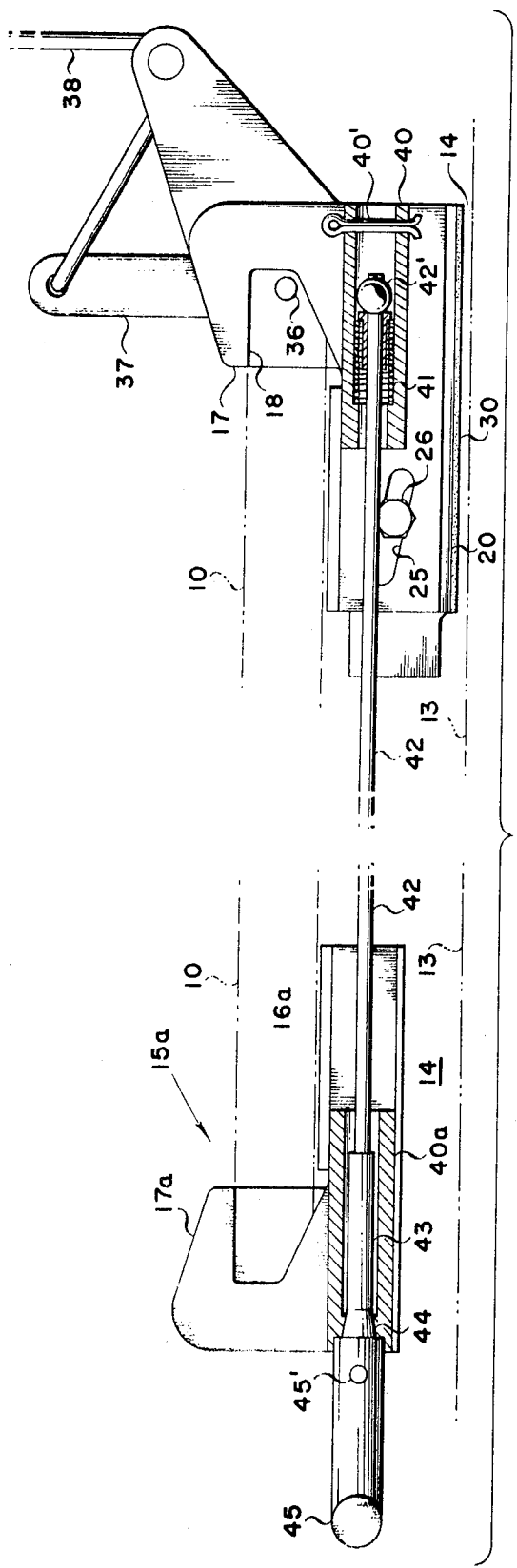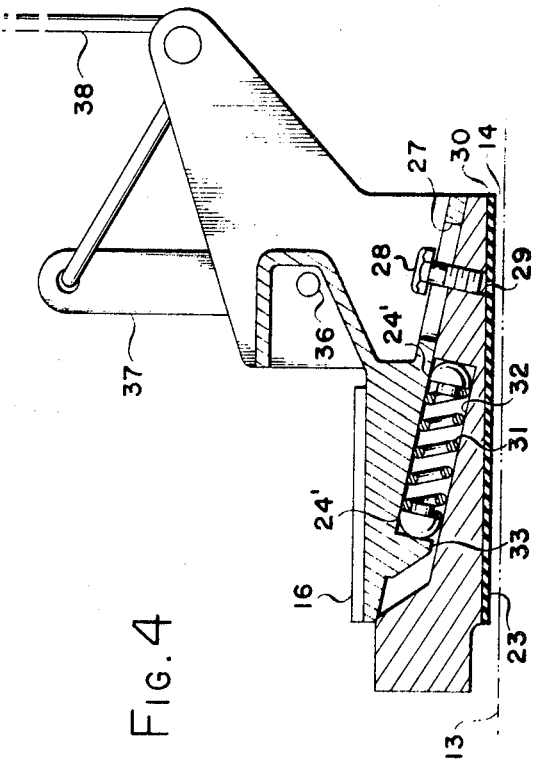
FIG. 3
FIG. 4
CHARLES V. SOUTHARD
INVENTOR.
BY *George A. Sullivan*
Agent
*John J. Sullivan*
Attorney

ANTISKID DEVICE This invention relates to antiskid devices, and more particularly to an antiskid device which is adapted to be secured to the undersurface of a cargo-carrying pallet where it is normally disposed in a retracted position of low profile with respect to the pallet so as not to interfere with the normal movement of the pallet over an associated surface and including means to automatically extend it, for example in an emergency, to a position where it engages the associated surface to serve as a chock against all movement of the pallet with respect to the surface.

Typically, the cargo being transported is containerized or packaged on pallets in order to expedite the loading thereof on and off vehicles and at the same time to optimize the use of the cargo compartment or hold of the vehicle. These cargo pallets are of standard size or sizes and, depending upon the particular circumstances, may be loaded singly or in interconnected trains from the storage area, dock or platform onto and off of the vehicle. In any case, these pallets are of substantial mass and power loading means, such as, for example, power winches and the like, are generally employed to facilitate their movement.

These power devices are attached in an appropriate manner to the pallet by means of and through a tow cable and serve to pull or slide the pallet across the surface and up or down the ramp as the case may be in the on and off loading operation. During movement over an inclined surface, the sole support for the pallet and its load is the tension in the cable from the power winch to the pallet. If, for any reason this tension should slacken as for example because of the cable breaking or the power mechanism failing, the palletized load is released and may fall or slide by gravitational force along the incline surface.

The present invention has in view an emergency safety device which upon the above happening serves to stop the pallet against any movement on the inclined surface. This is not only in order to prevent damage to the cargo, but also possible injury to persons and/or property in the vicinity.

To this end, it is proposed that a special antiskid device be secured to the pallet with interconnecting means between it and the tow cable to lock the device in an inoperative position and automatically release it upon a slackening of the tow cable. When released this device moves to its operative position against the inclined surface where it acts as a wedge or chock to prevent all movement of the pallet on the inclined surface.

More specifically, this device consists of a pair of relatively movable plates one superposed on the other. The upper plate constitutes a bucket adapted to be fixedly secured to the pallet and the lower plate in the form of a wedge attaches to and is carried by the bracket, being capable of relative lateral movement therewith. Biasing means is provided between the two plates tending to move them away from one another, i. e., move the wedge laterally outward from its bracket. This biasing means or tendency is normally overpowered, however, by a cocking lever connected to the tow cable. If and when the cable slackens, this cocking lever is actuated to release the biasing means forcibly extending the wedge into the operative position.

With the above and other objects in view as will be apparent, this invention consists in the construction, combination, and arrangement of parts all as hereinafter more fully described, claimed and illustrated in the accompanying drawings wherein:

FIG. 1 is an isometric view of an anti-skid device as contemplated by this invention shown in exploded form so as to reveal the interacting components thereof which serve to locate the wedge in its operative and inoperative positions relative to its mounting bracket as well as the mechanism which moves it and/or permits it to move to and from such positions;

FIG. 2 is a similar view of the device as applied to a cargo pallet shown carrying a piece of cargo and operative on tracks over a surface;

FIG. 3 is a section taken along line 3—of FIG. 1 to show primarily the means of attachment of the wedge and bracket assembly to the pallet, only the associated portions of the pallet being shown in phantom lines and the wedge and bracket assembly being disposed in its normal or inoperative position in spaced relation to the associated surface; and FIG. 4 is a section taken along line 4—4 of FIG. 1 to show primarily the means of attachment of the wedge to its bracket and the biasing means operative therebetween, the wedge and bracket assembly being shown in its normal or inoperative position in spaced relation to the associated surface.

Referring more particularly to the drawings, 10 designates a pallet of the type employed in cargo-carrying or transport aircraft and 11 indicates and is illustrative of a piece cargo constituting its load. Generally, the direction of movement of the pallet 10 in the on-and-off loading thereof is controlled by means of and through some suitable guide, such as tracks 12, between which it is held against lateral movement or wandering.

Also, to facilitate its movement along the tracks 12, it is customary to elevate the lower surface of the pallet 10 from the associated ramp or dock surface 13 as indicated at 14 and thereby minimize the friction. Such spacing 14 is relatively little, on the order of only an inch or so, being established and maintained by anti-friction elements such as rollers or balls 13' rotatably mounted in and extending above the surface 13. The present invention takes advantage of this spacing 14 in order to employ the safety antiskid device herein contemplated.

To this end, this antiskid device is mounted to the undersurface of the pallet 10 and normally located out of contact with the adjacent dock or deck surface 13 over which the pallet 10 moves. This safety device includes bracket assembly 15 designed and adapted to be removably secured to the pallet 10 preferably located adjacent the edge of the pallet 10 which is to be on the uphill side as indicated by the arrow, FIG. 1. This bracket assembly 15 is provided with a flat surface 16 adapted to engage in flush abutment the lower surface of the pallet 10 and includes engagement or hook elements 17 adapted to secure it to complemental portions of the pallet 10 so as to become for all intents and purposes an integral part thereof. If desired, the surface 16 of the bracket assembly 15 as well as the adjacent surfaces 18 of the elements 17 may be appropriately padded to prevent any damage to the pallet.

The bracket assembly 15 is additionally formed with a pair of depending sides 20 defining a channel area 21 therein which is adapted to accommodate a spring-loaded wedge 22. This wedge 22 is formed by a lower surface 23 that is disposed in a single plane corresponding to that of the deck or dock surface 13. On its opposite side, the wedge 22 is formed with a sloping surface or surfaces 24 giving it an angular or wedge configuration. These sloping surfaces 24 lie in a common plane which conforms to the undersurface of the brackets 15 being adapted to abut therewith.

The respective sides 20 of the bracket 15 are perforated by slots 25 which are in alignment one with the other and sloped at an angle corresponding to that of the adjacent bracket and wedge surfaces 24. A bolt 26 threaded in a complemental hole 26' in the corresponding sides 20 of the wedge 22 passes through the associated slot 25 to allow relative sliding movement between the wedge 22 and the bracket 15 while at the same time preventing their complete separation.

A similar retention arrangement is provided at corresponding ends of the bracket assembly 15 and wedge 22. Thus, a slot 27 pierces the bracket 15 adjacent each corner thereof to accommodate a bolt 28 which threads into a hole 29 provided in the wedge 22 thereof.

Movement between the wedge 22 and bracket assembly 15 is biased to the extended position, i.e., tending to force the wedge 22 and bracket 15 away from each other. When so disposed, the undersurface 23 of the wedge 22 is forced into abutment against the dock or deck surface 13. In order to apply maximum friction in this position, the undersurface 23 of the wedge 22 may be provided with appropriate high friction material in the form of a rubber pad or the equivalent indicated generally at 30.

The bias action between the wedge 22 and bracket 15 is effected by means of and through a compression spring 31 operative therebetween on each side. Each such spring 31 is located within a channel 32 cut out or otherwise provided in each of the outermost wedge surfaces 24 where it is disposed in a seat 24'. Each seat 24' is formed in a hemisphere with the flat side thereof adjacent the spring 31 and peripherally notched to receive the associated spring end. One spring seat 24' abuts the end wall of the channel 32 while the other spring seat 24' engages the face of a depending projection 33 carried by the bracket 15. The wedge 22 and bracket 15 are thereby normally forced in opposite directions with their adjacent sloping surfaces 24 so disposed as to locate their surfaces 16 and 23 the maximum distance apart.

In order to secure the wedge 22 and bracket 15 in the non-operative position, i.e., in the contracted position with their surfaces 23 and 16 respectively at a minimum distance apart and the wedge surface 23 out of contact with the deck or floor surface 13, means is provided to overpower the normal bias thereof. This means consists generally of a rack 34 and pinion 35 arrangement whereby the wedge 22 is secured to the bracket 15 against all relative movement.

More specifically, the center sloping surface 24 of the wedge 22 adjacent the apex end is formed or otherwise provided with the rack or a rack segment 34 adapted to receive and coact with the teeth of the pinion 35 carried by the bracket 15. To this end, the bracket 15 is provided with a spindle 36 mounted between the upstanding hooks 17 thereof on which the pinion 35 is rotatably mounted. Extending from the opposite side of the pinion 35 is a lever 37 to which a lanyard 38 is adapted to be connected. This lanyard 38 extends therefrom for attachment to the tow cable (not shown) which is used in order to forcibly move the pallet 10 over the rollers 13' along the tracks 12 into and out of the aircraft, for example.

When the tow cable is under tension, a force is applied to the lanyard 38 serving to rotate the pinion 35 into engagement with the lowermost teeth of the rack 34 retaining the wedge 22 and bracket 15 in the contracted position defining a minimum profile. When, however, for any reason the lanyard 38 slackens the overpowering force applied through the rack 34 and pinion 35 engagement is released and the springs 31 are allowed to act under their normal bias. This causes an instantaneous movement of the wedge 22 relative to the bracket 15 to the extent allowed by the channel 32 which disposes the surface 23 of the wedge 22 in snug abutment against the dock or deck surface 13.

In view of the foregoing construction and arrangement, it is apparent that as the cargo 11 is being loaded on and off the aircraft or other vehicle by means of the tow cable, the instant safety device is disposed in an out-of-the-way position and due to the rollers 13' minimum friction is applied between the cargo pallet 10 and the deck or dock surface 13. When, however, for any reason, this towing force ceases and a slack occurs in the tow cable, the safety device is actuated to extend the wedge 22 with respect to its mounting bracket 15 whereby it is disposed in abutment against the dock or deck surface 13 acting as a brake to stop further movement of the pallet 10. In the event that, at this time, the pallet 10 is on an inclined surface, the safety device will serve to prevent any uncontrolled movement of the pallet 10 on that surface.

While the safety device as above described may be mounted to the pallet 10 through the hook elements 17 secured in position in various ways, it is desirable that they be quickly and readily released. Preferably this is accomplished by a clamping action produced through a retention bracket 15a similar in many respects in design and construction to the bracket 15.

This retention bracket 15a is formed with an upper surface 16a adapted to abut the undersurface of the pallet 10 when installed thereon. A pair of upstanding hook elements 17a on the bracket 15a are adapted to secure it to complemental portions of the pallet 10 acting in opposition to the hook elements 17 of the bracket assembly 15. At each side, the bracket 15a carries a cylindrical tubular casing 40a the equivalent in all respects to a similar casing 40 carried on each side of the bracket 15.

A compression spring 41 is confined within the casing 40 on each side of the bracket 15 through each of which one end of a cable 42 passes. Each of these ends of the cable 42 carries an enlargement 42' which is preferably spherical and has a diameter substantially equal to the internal diameter of the associated casing 40 so as to slide freely therealong but with limited lateral movability. To further assure this operation of ends 42' in their casings 40, a sleeve 41' is provided on the ends of the cable 42 inwardly of the associated enlargement 42'. Each of these sleeves 41' is formed with a collar 42'' adjacent its enlargement 42' which abuts the end of the associated spring 41 while the remainder thereof extends inwardly of the spring a substantial distance, preferably more than half the length thereof to serve as a support therefor during its extension and contraction. An obstruction in the form of a transverse pin 40' or the like is employed to prevent movement of the enlargement 42' and cable 42 out of the casing 40.

The other ends of these cables 42 within the casings 40a respectively each terminates in a fitting 43 swaged, for example, thereto. Each of these fittings 43 terminates in an enlargement 44 adapted to seat within a recess provided therefor in the end of the associated casing 40a and to which a "T" handle 45 is secured as at 45'.

The distance between the brackets 15 and 15a and the clamping force applied by the hook elements 17 and 17a in opposition to each other on and against the pallet 10 is thereby variable to the extent permitted by the springs 41. This allows installation and removal of the bracket assembly 15 and wedge 22 on and off of the pallet 10 quickly, providing a reliable and positive device, when installed, to withstand the rigors of the loading and unloading operations as well as the forces which accompany its emergency operation. By the provision of a turnbuckle 46 in the length of each retention cable 42 in conventional manner, the necessary and selected range of adjustment is possible.

What is claimed is:

1. An antiskid device for a cargo-carrying pallet comprising:
   a bracket assembly adapted to be secured to said pallet on the underside thereof and having an upper surface in abutment with the under surface of said pallet;
   a wedge mounted on the underside of said bracket assembly for limited relative sliding movement therewith, said bracket assembly and said wedge including adjacent sloping surfaces whereby the sliding movement aforesaid causes the vibration of the overall thickness of the bracket assembly and wedge;
   a force-exerting unit operative between said bracket assembly and wedge normally operative to move them to and retain them in the position of maximum thickness; and
   a releasable engagement normally operative on and against said force-exerting unit in opposition to its normal action to secure the bracket assembly and wedge in the position of minimum thickness, said engagement comprising a rack and pinion arrangement operatively mounted between said bracket assembly and said wedge.

2. The device of claim 1 wherein said bracket assembly comprises a hook element in overlapping engagement with the marginal edge of said pallet and including a retention bracket secured to the underside of said pallet at the opposed end thereof with respect to said bracket assembly, said retention bracket comprising a hook element in overlapping engagement with the associated marginal edge of said pallet, and a tension spring-loaded cable interconnecting said bracket assembly and said retention bracket.

3. The device of claim 2 including a turnbuckle in the length of said tension spring-loaded cable whereby the clamping force applied thereby on said bracket assembly and said retention bracket is adjustable.

4. The device of claim 1 wherein the rack of said rack and pinion arrangement is carried by said wedge and the pinion of said rack and pinion arrangement is rotatably mounted on said bracket assembly having teeth in coacting engagement with said rack.

5. The device of claim 1 wherein said bracket assembly is formed with depending sides defining a channel adapted to accommodate said wedge, elongated slots for the passage of bolts threaded into said wedge for the interconnection thereof and a depending projection adapted for sliding movement in a complemental channel in said wedge, and said force-exerting unit includes a compression spring mounted in said complemental channel between said depending projection and an end wall of said complemental channel.

6. The device of claim 1 wherein said wedge includes an under surface disposed in a single plane and fabricated of high friction material.

* * * * *